United States Patent
Seo et al.

(10) Patent No.: US 11,572,466 B2
(45) Date of Patent: Feb. 7, 2023

(54) LOW-GLOSS CURED PRODUCT HAVING EXCELLENT STAIN RESISTANCE, AND MANUFACTURING METHOD THEREFOR

(71) Applicant: LG HAUSYS, LTD., Seoul (KR)

(72) Inventors: Ji Yeon Seo, Seoul (KR); Heon Jo Kim, Seoul (KR); Tae Yi Choi, Seoul (KR)

(73) Assignee: LG Hausys, Ltd., Seoul (KR)

( * ) Notice: Subject to any disclaimer, the term of this patent is extended or adjusted under 35 U.S.C. 154(b) by 554 days.

(21) Appl. No.: 16/495,783

(22) PCT Filed: May 18, 2018

(86) PCT No.: PCT/KR2018/005715
§ 371 (c)(1),
(2) Date: Sep. 19, 2019

(87) PCT Pub. No.: WO2018/216969
PCT Pub. Date: Nov. 29, 2018

(65) Prior Publication Data
US 2020/0024439 A1    Jan. 23, 2020

(30) Foreign Application Priority Data

May 22, 2017 (KR) .......................... 10-2017-0062811

(51) Int. Cl.
*C08L 33/06*    (2006.01)
*C08J 7/18*    (2006.01)
(Continued)

(52) U.S. Cl.
CPC .............. *C08L 33/066* (2013.01); *C08J 7/18* (2013.01); *C08K 3/36* (2013.01); *C08K 5/0025* (2013.01);
(Continued)

(58) Field of Classification Search
None
See application file for complete search history.

(56) References Cited

U.S. PATENT DOCUMENTS 4,169,167 A * 9/1979 McDowell ........... B41M 7/0045
427/494
4,421,784 A * 12/1983 Troue .................... G03F 7/2022
427/493
(Continued)

FOREIGN PATENT DOCUMENTS

CN     1112594 A     11/1995
CN     101153935 A    4/2008
(Continued)

OTHER PUBLICATIONS

JP-2005272564-A, Oct. 2005, Derwent Ab. (Year: 2005).*
JP2006198511 A1, Aug. 2006, Machine translation (Year: 2006).*

*Primary Examiner* — Satya B Sastri
(74) *Attorney, Agent, or Firm* — Dentons US LLP

(57) ABSTRACT

The present invention relates to a cured product having excellent stain resistance and low gloss, a method of manufacturing the same, and an interior material including the cured product. The cured product according to the present invention is formed by sequentially applying light in different specific wavelength ranges to a composition to cure the composition, thereby being capable of realizing a low gloss of 9 or less, based on a 60 degree gloss meter, without use of a matting agent and excellent stain resistance and exhibiting excellent abrasion resistance. Accordingly, the cured product may be usefully used as an interior material such as a flooring material.

5 Claims, 1 Drawing Sheet

(51) Int. Cl.
*C08K 3/36* (2006.01)
*C08K 5/00* (2006.01)
*C08K 7/20* (2006.01)
*C08K 3/22* (2006.01)
*E04F 15/00* (2006.01)

(52) U.S. Cl.
CPC ............... *C08K 7/20* (2013.01); *E04F 15/00* (2013.01); *C08K 2003/2227* (2013.01); *C08L 2205/18* (2013.01)

(56) References Cited

U.S. PATENT DOCUMENTS

| | | | |
|---|---|---|---|
| 6,146,711 A | 11/2000 | Courtoy et al. | |
| 6,572,932 B2 * | 6/2003 | Sigel | C08F 283/01 427/508 |
| 2006/0264588 A1 * | 11/2006 | Tokuda | C08F 290/061 526/209 |
| 2013/0059105 A1 | 3/2013 | Wright et al. | |
| 2014/0371384 A1 * | 12/2014 | Fischer | B05D 3/067 524/556 |
| 2016/0145449 A1 * | 5/2016 | Hilgers | C09D 7/42 522/18 |
| 2016/0326275 A1 | 11/2016 | Ashikaga et al. | |

FOREIGN PATENT DOCUMENTS

| | | | | |
|---|---|---|---|---|
| CN | 102618163 A | | 8/2012 | |
| CN | 103666149 A | | 3/2014 | |
| CN | 104603216 A | | 5/2015 | |
| CN | 105585942 A | | 5/2016 | |
| EP | 1072659 A1 | | 10/2005 | |
| EP | 3202865 A1 | | 8/2017 | |
| JP | 2003-165928 A | | 6/2003 | |
| JP | 2004-238556 A | | 8/2004 | |
| JP | 2005-272564 A | | 10/2005 | |
| JP | 2005272564 A | * | 10/2005 | |
| JP | 2006198511 A | * | 8/2006 | ............... C09D 4/00 |
| KR | 10-01195897 B1 | | 10/2012 | |
| KR | 10-2014-0027642 A | | 3/2014 | |
| KR | 10-2015-0078897 | | 7/2015 | |
| KR | 10-1545377 B1 | | 8/2015 | |
| KR | 10-1584491 B1 | | 1/2016 | |
| KR | 10-2016-0038937 A | | 4/2016 | |
| WO | WO-9214555 A1 | * | 9/1992 | ............ B05D 3/066 |
| WO | 2006077664 A1 | | 7/2006 | |
| WO | 2012033483 A1 | | 3/2012 | |

* cited by examiner

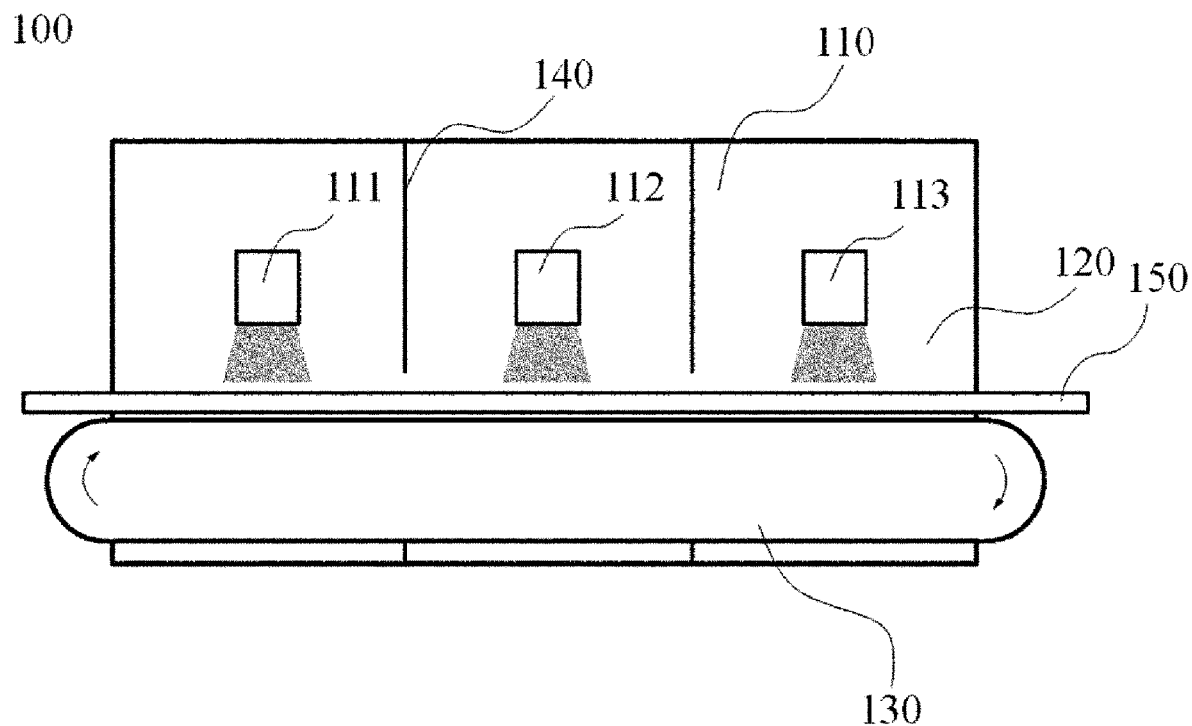

LOW-GLOSS CURED PRODUCT HAVING EXCELLENT STAIN RESISTANCE, AND MANUFACTURING METHOD THEREFOR

This application is a National Stage Entry of International Application No. PCT/KR2018/005715, filed May 18, 2018, and claims the benefit of Korean Application No. 10-2017-0062811, filed on May 22, 2017, all of which are hereby incorporated by reference in their entirety for all purposes as if fully set forth herein.

TECHNICAL FIELD

The present invention relates to a cured product having excellent stain resistance and low gloss, a method of manufacturing the same, and an interior material including the cured product, and more particularly, to a cured product being capable of realizing low gloss without a matting agent through sequential use of light in different specific wavelength ranges during curing and exhibiting high stain resistance, a method of manufacturing the cured product, and an interior material including the cured product.

BACKGROUND ART

In general, residential flooring, which is generally used to finish floors of living rooms and rooms of detached houses or apartments, provides a hygienic space by blocking dust and chilly air from a cement floor. Such residential flooring is printed with various beautiful patterns, thereby providing decorative effects such as changing an indoor atmosphere to make it cozy according to customer demand. When a surface of such existing flooring is contaminated with contaminants, a user cannot easily remove traces of the contaminants. Such flooring with traces of contaminants cannot fulfill basic functions thereof.

To address such a problem, Korean Patent Application Publication No. 2015-0078897 discloses a technology of forming a surface treatment layer on an uppermost layer of a flooring material, thereby imparting stain resistance, as well as abrasion resistance and scratch resistance, to the flooring material. However, in the case of conventional flooring, stain resistance is decreased as gloss decreases, whereby difficulty in cleaning greatly increases. Accordingly, it is difficult to impart natural gloss, as in a natural material, while maintaining high stain resistance. In particular, when conventional flooring materials, to which stain resistance is imparted, are contaminated by oil-based magic-marker marks and other pollutants, the contaminants are erased from a flooring material having a gloss of 10 or higher, but are not erased from a flooring material having a gloss of 8 or less, based on a 60 degree gloss meter. In addition, stain resistance is rapidly decreased due to abrasion of silicon included in an ultraviolet-cured surface treatment composition for treating surfaces of the flooring materials. In addition, a conventional ultraviolet-cured surface treatment composition includes an increased amount of silica as a matting agent so as to lower the gloss of a flooring material treated therewith. Since such silica is porous and has a very low apparent specific gravity, fine dust, moisture, oil, and the like are easily adsorbed and stain resistance is rapidly decreased, as the content of the silica increases. In addition, traces such as fingerprints, footprints, and sweat stains remain on a surface of a floor material surface-treated with the matting agent, and the appearance of the floor material becomes cloudy like fog.

Accordingly, there is an urgent need for development of a material having a surface contact area and thus having improved stain resistance to the extent of preventing easy contamination by oil stains, food stains, pencil marks, dust, and ingrained stains at home, while realizing the gloss of a flooring material in a low state without a matting agent.

DISCLOSURE

Technical Problem

The present invention is directed to providing a cured product exhibiting excellent stain resistance while realizing surface gloss in a low state without use of a matting agent, and an interior material using the cured product.

Technical Solution

One aspect of the present invention provides:
a cured product formed of an acrylic resin composition, wherein the cured product has a surface gloss of 9 or less under a 60° gloss condition, and
an average color coordinate deviation ($\Delta E$) before and after iodine contamination of a surface of the cured product that has been contaminated with 1 vol % of an iodine solution at 22±1° C. and 50±5% RH and, after 60 minutes, washed for stain resistance evaluation is 1 or less.

Another aspect of the present invention provides a method of manufacturing a cured product, the method including:
a first light irradiation step of irradiating an acrylic resin composition with light having a wavelength of 300 nm or less to activate a composition;
a second light irradiation step of irradiating the activated composition with light having a wavelength of 700 nm or higher to thermally cure the composition; and
a third light irradiation step of irradiating the thermally cured composition with light having a wavelength of 400 nm or less to optically cure the composition.

Still another aspect of the present invention provides an interior material including a substrate; and a cured product formed on the substrate.

Advantageous Effects

A cured product according to the present invention is formed by sequentially applying light in different specific wavelength ranges to a composition to cure the composition, thereby being capable of realizing a low gloss of 9 or less, based on a 60 degree gloss meter, without use of a matting agent and excellent stain resistance and exhibiting excellent abrasion resistance.

DESCRIPTION OF DRAWINGS

FIG. 1 is a structural diagram briefly illustrating the structure of a light-curing apparatus used in the present invention.

100: Light-curing apparatus
110: Light irradiation room
111: First light irradiator (UV irradiator)
112: Second light irradiator (IR irradiator)
113: Third light irradiator (UV irradiator)
120: Irradiated light
130: Conveyor belt
140: Gas diaphragm
150: Specimen

BEST MODE FOR CARRYING OUT THE INVENTION

As the invention allows for various changes and numerous embodiments, particular embodiments are illustrated in the drawings and described in detail in the written description.

However, this is not intended to limit the present invention to particular modes of practice, and it is to be appreciated that all changes, equivalents, and substitutes that do not depart from the spirit and technical scope of the present invention are encompassed in the present invention.

In the present invention, the terms such as "include" or "comprise" should be construed to denote a certain characteristic, number, step, operation, constituent element, or a combination thereof, but should not be construed to exclude the existence of or a possibility of addition of one or more other characteristics, numbers, steps, operations, constituent elements, or combinations thereof.

In addition, the accompanying drawings shown in the present invention should be understood as being enlarged or reduced for convenience of description.

Hereinafter, the present invention will be described in detail with reference to the attached drawings. The same or corresponding components in the drawings are provides with the same reference numerals, and a repeated explanation thereof will not be given.

In the present invention, "color coordinates" means coordinates in the CIE color space, which are color values defined by Commission International de l'Eclairage (CIE). Arbitrary positions in the CIE color space may be represented by three coordinate values, i.e., $L^*$, $a^*$, $b^*$.

Here, the $L^*$ value represents brightness, when $L^*=0$, it represents black, and when $L^*=100$, it represents white. In addition, the $a^*$ value represents a color having a corresponding color coordinate that leans toward one of pure magenta and pure green, and the $b^*$ value represents a color having a corresponding color coordinate that leans toward one of pure yellow and pure blue.

In particular, the $a^*$ value is in a range of $-a$ to $+a$, a maximum value ($a^*$ max) of $a^*$ represents pure magenta, and a minimum value ($a^*$ min) of $a^*$ represents pure green. For example, a negative $a^*$ value represents a color leaning toward pure green, and a positive $a^*$ value represents a color leaning toward pure magenta. Comparing $a^*=80$ with $a^*=50$, $a^*=80$ is closer to pure magenta than $a^*=50$. In addition, the $b^*$ value is in a range of $-b$ to $+b$. A maximum value ($b^*$ max) of $b^*$ represents pure yellow, and a minimum value ($b^*$ min) of $b^*$ represents pure blue. For example, a negative $b^*$ value represents a color leaning toward pure blue, and a positive $b^*$ value represents color leaning toward pure yellow. When comparing $b^*=80$ with $b^*=20$, $b^*=80$ is closer to pure yellow than $b^*=20$.

Further, in the present invention, "color deviation" or "color coordinate deviation" means a distance between two colors in the CIE color space. That is, a difference in color increases with an increasing distance, and there is less difference in color with a decreasing distance. This may be represented by $\Delta E^*$ according to Equation 1 below:

$$\Delta E^* = \sqrt{(\Delta L^*)^2 + (\Delta a^*)^2 + (\Delta b^*)^2} \quad \text{[Equation 1]}$$

The present invention relates to a cured product having excellent stain resistance and low gloss, a method of manufacturing the same, and an interior material including the cured product.

When a surface of existing flooring is contaminated with contaminants, a user cannot easily remove traces of the contaminants. Such flooring with traces of contaminants cannot fulfill basic functions thereof. To address such a problem, a surface treatment layer is formed on an uppermost layer of a flooring material, whereby stain resistance, as well as abrasion resistance and scratch resistance, are imparted to the flooring material.

However, in the case of conventional flooring, stain resistance is decreased as gloss is low, whereby difficulty in cleaning greatly increases. Accordingly, it is difficult to impart natural gloss, as in a natural material, while maintaining high stain resistance. In particular, when conventional flooring materials, to which stain resistance is imparted, are contaminated by an oil-based magic-marker marks and other pollutants, the contaminants are erased from a flooring material having a gloss of 10 or higher, but are not erased from a flooring material having a gloss of 8 or less, based on a 60 degree gloss meter. In addition, stain resistance is rapidly decreased due to abrasion of silicon included in an ultraviolet-cured surface treatment composition for treating surfaces of the flooring materials. In addition, a conventional ultraviolet-cured surface treatment composition includes an increased amount of silica as a matting agent so as to lower the gloss of a flooring material treated therewith. Since such silica is porous and has a very low apparent specific gravity, fine dust, moisture, oil, and the like are easily adsorbed and stain resistance is rapidly decreased, as the content of the silica increases. In addition, traces such as fingerprints, footprints, and sweat stains remain on a surface of a floor material surface-treated with the matting agent, and the appearance of the floor material becomes cloudy like fog.

Accordingly, the present invention provides a cured product being capable of realizing low gloss without a matting agent and exhibiting high stain resistance, a method of manufacturing the same, and an interior material including the cured product.

The cured product according to the present invention is formed by sequentially applying light in different specific wavelength ranges to a composition, thereby being capable of realizing a low gloss of 9 or less, based on a 60 degree gloss meter, without use of a matting agent, excellent stain resistance, and excellent abrasion resistance.

Hereinafter, the present invention is described in more detail

Cured Product

An embodiment of the present invention provides:

a cured product formed of an acrylic resin composition, wherein the cured product has a surface gloss of 9 or less under a 60° gloss condition, and an average color coordinate deviation ($\Delta E$) before and after iodine contamination of a surface of the cured product that has been contaminated with 1 vol % of an iodine solution at 22±1° C. and 50±5% RH and, after 60 minutes, washed for stain resistance evaluation is 1 or less.

The cured product according to the present invention is formed by curing a composition. More particularly, the cured product is formed by sequentially using light in different specific wavelength ranges upon curing of a composition, thereby being capable of realizing remarkably low surface gloss without use of a matting agent and exhibiting excellent stain resistance.

As one example, a reduced surface gloss of the cured product may be 9 or less under a 60° gloss condition using a gloss meter. In particular, an upper limit of the reduced surface gloss may be 8 or less, 7.5 or less, 7 or less, 6.5 or less, 6 or less, or 5 or less, and a lower limit thereof may be 0.1 or more, 0.5 or more, 1 or more, 1.5 or more, 2 or more, 2.5 or more, or 3 or more. For example, a surface gloss of the cured product may be 1 to 8, 1 to 7, 1 to 6, 4 to 8, 4 to 7, 7 to 9, 7.2 to 8.7, 4 to 6, 2 to 5, or 3.2 to 4.7.

As another example, the stain resistance of a surface of the cured product is improved, and thus, an average color coordinate deviation ($\Delta E$) before and after iodine contamination of the surface of the cured product that has been contaminated with 1 vol % of an iodine solution at 22±1° C. and 50±5% RH and, after 60 minutes, washed for stain resistance evaluation may be 1 or less. Particularly, an upper limit of the average color coordinate deviation ($\Delta E$) may be 0.9 or less, 0.8 or less, 0.7 or less, 0.6 or less, or 0.5 or less, and a lower limit thereof may be 0.01 or more, 0.05 or more, 0.1 or more, 0.15 or more, 0.2 or more, 0.25 or more, 0.3 or more, 0.35 or more, 0.4 or more, or 0.45 or more. For example, a color coordinate in the CIE color space before and after applying iodine ($I_2$) to the surface of the cured product may be 0.1 to 1, 0.2 to 0.9, 0.3 to 0.9, 0.4 to 0.9, 0.5 to 0.9, 0.6 to 0.9, 0.7 to 0.9, 0.3 to 0.8, 0.45 to 0.6, 0.5 to 0.7, 0.52 to 0.76, 0.72 to 0.76, 0.52 to 0.69, 0.32 to 0.76, or 0.48 to 0.55.

As still another example, when the cured product is subjected to an abrasion resistance test 500 times under conditions of an H-18 abradant and a load of 500 g, a weight change in the worn specimen (having a width and length of 10 cm×10 cm, an average thickness of the cured product is 18±2 μm) may be 400 mg or less. Particularly, an upper limit of the weight change may be 400 mg or less, 390 mg or less, 380 mg or less, 375 mg or less, 370 mg or less, 360 mg or less, 350 mg or less, 320 mg or less, 300 mg or less, or 275 mg or less, and a lower limit thereof may be 100 mg or more, 150 mg or more, 200 mg or more, 220 mg or more, 300 mg or more, 320 mg or more, 340 mg or more, or 350 mg or more. For example, a weight change in the cured product subjected to an abrasion resistance test may be 150 to 400 mg, 200 to 300 mg, 200 to 250 mg, 230 to 250 mg, 250 to 300 mg, 270 to 290 mg, 300 to 400 mg, 300 to 350 mg, 320 to 370 mg, 340 to 350 mg, 350 to 400 mg, 370 to 400 mg, 380 to 390 mg, or 383 to 387 mg.

Here, the composition, which is a matte-type composition, may include an acrylic oligomer, a monomer, and an initiator.

In particular, the acrylic oligomer is not specifically limited so long as it is obtained using a monomer. For example, the acrylic oligomer may include a (meth)acrylate oligomer, a urethane (meth)acrylate oligomer, etc.

In addition, In addition, the acrylic oligomer may have a weight average molecular weight (Mw) of 100 to 50,000, more particularly a weight average molecular weight (Mw) of 500 to 30,000; 500 to 10,000; 500 to 5,000; 500 to 3,000; 1,000 to 30,000; 1,000 to 10,000; 1,000 to 5,000; or 1,500 to 2,500. In the present invention, a weight average molecular weight of the acrylic oligomer is adjusted within the ranges, whereby the durability of the cured product is further improved.

In addition, the monomer may be an acrylic monomer, particularly an acrylate-based monomer containing a hydrophilic group, but the present invention is not limited thereto. For example, as the monomer, one or more selected from the group consisting of 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol (meth)acrylate or 2-hydroxypropylene glycol (meth)acrylate, acrylic acid, methacrylic acid, 2-(meth)acryloyloxyacetic acid, 3-(meth)acryloyloxypropyl acid, 4-(meth)acryloyloxybutyl acid, 1,6-hexanediol diacrylate, an acrylic acid dimer, itaconic acid, maleic acid, caprolactone-modified hydroxyl acrylate (CHA), tetraethylene glycol diacrylate, tripropylene glycol diacrylate, dipropylene glycol diacrylate, triethylene glycol diacrylate, pentaerythritol triacrylate, and trimethylolpropane ethoxy triacrylate may be included.

In addition, the composition may include 1 to 60 parts by weight of the acrylic oligomer and 30 to 100 parts by weight of the monomer. Based on 100 parts by weight of the sum of the acrylic oligomer and the monomer, an initiator may be included in an amount of 5 parts by weight or less, particularly 2 parts by weight or less, 1 part by weight or less, 0.1 to 2 parts by weight, 0.1 to 1.5 parts by weight, 0.1 to 1 part by weight, 0.5 to 2 parts by weight, 1 to 2 parts by weight, or 1.3 to 1.7 parts by weight. The present invention sequentially uses light in different specific wavelength ranges to cure the composition, thereby being capable of exhibiting a high curing rate even using a small amount of initiator.

Further, the composition according to the present invention may further include a filler having hardness so as to improve the durability of the cured product. For example, the filler is not specifically limited so long as surface hardness can be increased without affecting the gloss of a cured product after curing of a composition. Particularly, colloidal silica, alumina, glass beads, organic beads (polymer particles, etc.), etc. may be used, and an average particle diameter thereof may be 0.1 to 100 nm, 0.1 to 50 nm, 0.1 to 20 nm, 0.2 to 10 nm, 0.5 to 5 nm, 5 to 10 nm, 5 to 20 nm, 10 to 20 nm, 20 to 50 nm, 40 to 60 nm, 50 to 100 nm, 15 to 20 nm, or 8 to 12 nm. When an average particle diameter of the filler of the present invention is controlled within the ranges, crack occurrence in the cured product may be prevented without affecting the gloss of the cured product, and the adhesive strength between the cured product and other layers may be increased, thereby increasing durability. In addition, the filler may be included in an amount of 3 parts by weight or less based on 100 parts by weight of the composition so as not to deteriorate gloss and stain resistance of the cured product. As one example, the filler may be included in an amount of 3 parts by weight or less, 0.1 to 3 parts by weight, 0.1 to 2.5 parts by weight, 0.5 to 2.5 parts by weight, 1 to 3 parts by weight, 1.5 to 3 parts by weight, 2.5 to 3 parts by weight, 1.5 to 2 parts by weight, 2 to 2.5 parts by weight, or 2.2 to 2.7 parts by weight based on 100 parts by weight of the composition.

Method of Manufacturing Cured Product

In addition, an embodiment of the present invention provides a method of manufacturing a cured product, the method including:

a first light irradiation step of irradiating an acrylic resin composition with light having a wavelength of 300 nm or less to activate a composition;

a second light irradiation step of irradiating the activated composition with light having a wavelength of 700 nm or higher to thermally cure the composition; and a third light irradiation step of irradiating the thermally cured composition with light having a wavelength of 400 nm or less to optically cure the composition.

The present invention includes a step of sequentially irradiating an acrylic resin composition three times with light in different specific wavelength ranges to cure the acrylic resin composition.

Here, the first light irradiation step is a first step of irradiating a composition applied on a substrate with light. In the first light irradiation step, an excimer generated by irradiated light forms wrinkles by shrinking the applied composition and/or a surface of the cured product, thereby increasing a scattering rate of light incident on the surface. The present invention includes the first light irradiation step of forming an excimer, thereby being capable of shrinking the composition and/or a surface of the cured product and increasing a scattering rate of light. Accordingly, the present invention may lower a gloss degree of the cured product without use of a matting agent. For this, the first light irradiation step may be performed using high-energy light in a wavelength region of 300 nm or less, particularly 250 nm or less, more particularly 100 to 200 nm or 150 to 200 nm, in a nitrogen ($N_2$) atmosphere including a small amount of oxygen ($O_2$). Here, the concentration of oxygen ($O_2$) included in a nitrogen ($N_2$) atmosphere may be 10 to 10,000 ppm, particularly 10 to 5,000 ppm, 1,000 to 2,000 ppm, 2,000 to 3,000 ppm, 3,000 to 4,000 ppm, 4,000 to 5,000 ppm, 10 to 2,000 ppm, 10 to 1,000 ppm, 10 to 500 ppm, 100 to 300 ppm, 10 to 200 ppm, 50 to 150 ppm, or 80 to 120 ppm.

As one example, in the first light irradiation step, the composition may be irradiated with light having a wavelength of 175±2 nm for a very short time of 1 to 2 seconds under a nitrogen ($N_2$) condition containing 100±10 ppm of oxygen ($O_2$) so as to form an excimer in the composition.

In addition, the composition may be applied to the substrate by a method known in the technical field to which the present invention pertains. For example, methods such as rubber rolling, G/V rolling, an air knife method, and a slot die method may be used.

In addition, the second light irradiation step is a step of applying thermal energy to the surface-shrunk composition and/or cured product to activate the same. Here, the thermal energy may be applied by irradiating a wavelength of 700 nm or more, particularly a wavelength of 700 nm to 900 nm, 750 nm to 900 nm, or 750 nm to 850 nm, under an air condition. The temperature of a thermal energy-applied composition and/or cured product surface may be 20° C. to 90° C., particularly 30 to 80° C., 30 to 50° C., 40 to 60° C. or 50 to 80° C.

As one example, the second light irradiation step may be performed by irradiating the composition and/or the cured product with light having a wavelength of 800±2 nm for a very short time of 1 to 2 seconds under an air condition.

In addition, the third light irradiation step is a step of primarily applying light energy to the thermally cured composition and/or a cured product to cure the same. Here, the light energy may be applied using light having a wavelength of 400 nm or less, particularly 100 nm to 400 nm, 200 nm to 400 nm, 200 nm to 300 nm, 300 nm to 400 nm, 150 nm to 300 nm, 200 nm to 250 nm, or 270 nm to 320 nm, in a nitrogen ($N_2$) atmosphere including a small amount of oxygen ($O_2$). Here, the concentration of oxygen ($O_2$) included in the nitrogen ($N_2$) atmosphere may be 10 to 10,000 ppm, particularly 10 to 5,000 ppm, 1,000 to 2,000 ppm, 2,000 to 3,000 ppm, 3,000 to 4,000 ppm, 4,000 to 5,000 ppm, 100 to 1,000 ppm, 100 to 500 ppm, 100 to 200 ppm, 10 to 2,000 ppm, 10 to 1,000 ppm, 10 to 500 ppm, 100 to 300 ppm, 10 to 200 ppm, 50 to 150 ppm, or 80 to 120 ppm.

Further, the method of manufacturing the cured product according to the present invention may further include, after the third light irradiation step, a fourth light irradiation step of irradiating the optically cured composition with light having a wavelength of 700 nm or higher to thermally cure the composition. The fourth light irradiation step is a step of additionally performing thermal curing of the composition. Here, the thermal energy may be applied by irradiating light having a wavelength of 700 nm or more, particularly a wavelength of 700 nm to 900 nm, 750 nm to 900 nm, or 750 nm to 850 nm, under an air condition. The temperature of the thermal energy-applied composition and/or cured product surface may be 20 to 90° C., particularly 30° C. to 80° C.

As one example, the fourth light irradiation step may be performed by irradiating the composition and/or the cured product with light having a wavelength of 800±2 nm for a very short time of 1 to 2 seconds under an air condition.

In the present invention, light having a wavelength required in each step may be irradiated according to known methods. For example, light having a wavelength of 400 nm or less, which is in a UV region, may be irradiated using a mercury or metal halide lamp, or the like. Here, a light irradiation amount may be 500 mJ/cm$^2$ to 1,300 mJ/cm$^2$, or 700 mJ/cm$^2$ to 1,100 mJ/cm$^2$.

In addition, in the present invention, a light irradiation time may be a very short time of 1 to 2 seconds. Such a light irradiation time may be controlled according to a migration rate of a composition, e.g., a migration rate of a composition coated on a substrate, during light irradiation. For example, a migration rate of the composition and/or the substrate coated with the composition may be 1 to 50 m/min, particularly 5 to 40 m/min, 10 to 40 m/min, 20 to 40 m/min, 30 to 40 m/min, 15 to 25 m/min, 5 to 15 m/min, 15 to 20 m/min, 35 to 40 m/min, or 18 to 22 m/min Meanwhile, the composition used in the present invention excludes a matting agent for reducing the gloss of a cured product, unlike existing compositions. Accordingly, the composition may have a low viscosity of 100 to 1,000 cps, particularly 100 to 800 cps, 100 to 500 cps, 100 to 400 cps, 150 to 350 cps, 200 to 350 cps, 250 to 350 cps, or 280 to 300 cps, at 25° C. Even when a filler is further included to increase the durability of the cured product, a low viscosity of 350 cps or less may be exhibited. Since the composition has a low viscosity of 350 cps or less, excellent workability is realized.

Interior Material

Further, an embodiment of the present invention provides an interior material including a cured product according to the present invention.

The interior material according to the present invention includes the aforementioned cured product according to the present invention, thereby simultaneously realizing low gloss and high stain resistance and abrasion resistance. Accordingly, the interior material may be usefully used for flooring requiring low gloss and high durability, and the like.

Here, the interior material may include the cured product according to the present invention as a surface treatment layer formed on a substrate thereof. As needed, so as to add functions to the interior material, functional layers such as a printed layer, a balance layer, and a dimensionally stable layer may be further included between the substrate and the cured product as a surface treatment layer. As one example, the interior material may have a structure wherein a balance layer, a substrate layer, a printed layer, a transparent layer, and a surface treatment layer are sequentially laminated, or a structure wherein a substrate layer, a printed layer, a transparent layer, and a surface treatment layer are sequentially laminated.

Here, the transparent layer, the printed layer, the substrate layer, and the balance layer, for example, may be formed by optically or thermally curing respective compositions including at least one selected from the group consisting of a binder resin, an initiator, a curing agent, other additives, and a combination thereof, or may be formed in a film or sheet shape using an extrusion method, a calendering method, or the like.

In addition, the types and contents of components included in each of the compositions may be appropriately adjusted, without specific limitation, according to the property and function of each layer thereof.

In particular, the flooring material may be formed by applying a predetermined composition to one surface of any one layer thereof, and then optically or thermally curing the same, or may be manufactured by forming respective layers thereof as a film or a sheet, and then laminating the same by a lamination process known in the art, but the present invention is not limited thereto.

In addition, the binder resin may include a synthetic resin, a bioresin, or both, for example, a polyvinyl chloride (PVC) resin, a polyurethane resin, a polylactic acid-based resin, a polyolefin resin, or the like, but the present invention is not limited thereto.

In addition, the transparent layer may have a thickness of about 0.05 mm to about 2.0 mm. When the thickness of the transparent layer is within the range, a design or pattern of a printed layer laminated under the transparent layer, as described below, may be sufficiently protected without an excessive increase in the thickness of the flooring material.

In addition, a pattern of the printed layer may be formed in various ways such as, for example, transfer printing, gravure printing, screen printing, offset printing, rotary printing, and flexographic printing. Further, the printed layer may have a thickness of about 1 μm to about 10 μm, but the present invention is not limited thereto.

In addition, the substrate layer is a base layer of the flooring material and may serve to support a transparent layer and printed layer formed thereon and absorb impact applied from above or below. In addition, the substrate layer may have a thickness of about 1.0 mm to about 3.0 mm, but the present invention is not limited thereto.

Further, the balance layer is a part bonded to a bottom surface upon construction and may serve to protect a back surface opposite to a surface of the flooring material and protect against moisture of the bottom. In addition, the balance layer may have a thickness of about 1.0 mm to about 3.0 mm, but the present invention is not limited thereto.

In addition, one or more of the base layer and the balance layer may further include at least one selected from the group consisting of $TiO_2$, $CaCO_3$, wood flour, mica, glass fiber, starch, natural fiber, chaff, rosin, talc, and a combination thereof.

In addition, a dimensionally stable layer may be further included between the printed layer and the base layer. Here, the dimensionally stable layer may have a thickness of about 0.1 mm to about 2.0 mm, but the present invention is not limited thereto.

The dimensionally stable layer may be formed of a composite material including a binder resin and glass fiber impregnated therein and serves to reduce a dimensional strain rate even at high temperature and high humidity. Accordingly, the dimensionally stable layer may maintain high adhesive strength to other layers laminated thereon and thereunder while imparting excellent dimensional stability, thereby realizing excellent durability.

MODE FOR CARRYING OUT THE INVENTION

Hereinafter, the present invention will be described in detail by explaining examples and experimental examples of the invention.

However, these examples and experimental examples are provided for illustrative purposes only and should not be construed as limiting the scope and spirit of the present invention.

Examples 1 to 3

A composition including 50 parts by weight of a (meth) acrylate oligomer (weight average molecular weight: 2,200), 50 parts by weight of a monomer, and 1.5 parts by weight of an initiator was applied to a polyvinyl chloride (PVC) substrate having a width and length of 10 cm×10 cm, followed by fixing to a light-curing apparatus having a structure shown in FIG. 1. Next, light irradiation was performed stepwise as summarized in Table 1 below, thereby manufacturing a cured product formed by curing the composition on the substrate. Here, an average thickness of the cured product was 18±2 μm.

TABLE 1

| | | Example 1 | Example 2 | Example 3 | Example 4 |
|---|---|---|---|---|---|
| First light irradiation | Wavelength range | 172 ± 5 nm | 172 ± 5 nm | 172 ± 5 nm | 172 ± 5 nm |
| | Irradiation amount | 160 mJ/cm² | 120 mJ/cm² | 80 mJ/cm² | 120 mJ/cm² |
| | Substrate migration rate | 20 ± 1 m/min | 20 ± 1 m/min | 20 ± 1 m/min | 20 ± 1 m/min |
| | Gas condition | $N_2$ condition ($O_2$ 100 ppm) | $N_2$ condition ($O_2$ 100 ppm) | $N_2$ condition ($O_2$ 100 ppm) | $N_2$ condition ($O_2$ 100 ppm) |
| Second light irradiation | Wavelength range | 750 nm or higher | 750 nm or higher | 750 nm or higher | 750 nm or higher |
| | Surface temperature of cured product | 80 ± 1° C. | 60 ± 1° C. | 40 ± 1° C. | 60 ± 1° C. |
| | Substrate migration rate | 20 ± 1 m/min | 20 ± 1 m/min | 20 ± 1 m/min | 20 ± 1 m/min |
| | Gas condition | Under air condition | Under air condition | Under air condition | Under air condition |

TABLE 1-continued

|  |  | Example 1 | Example 2 | Example 3 | Example 4 |
|---|---|---|---|---|---|
| Third light irradiation | Wavelength range | 250~400 nm | 250~400 nm | 250~400 nm | 250~400 nm |
|  | Irradiation amount | 600 mJ/cm$^2$ | 800 mJ/cm$^2$ | 1,000 mJ/cm$^2$ | 800 mJ/cm$^2$ |
|  | Substrate migration rate | 20 ± 1 m/min | 20 ± 1 m/min | 20 ± 1 m/min | 20 ± 1 m/min |
|  | Gas condition | N$_2$ condition (O$_2$ 200 ppm) | N$_2$ condition (O$_2$ 200 ppm) | N$_2$ condition (O$_2$ 1,000 ppm) | N$_2$ condition (O$_2$ 200 ppm) |
| Fourth light irradiation | Wavelength range | — | — | — | 750 nm or higher |
|  | Irradiation amount | — | — | — | 60 ± 1° C. |
|  | Substrate migration rate | — | — | — | 20 ± 1 m/min |
|  | Gas condition | — | — | — | Under air condition |

Example 4

A cured product was formed by curing a composition on a substrate in the same manner as in Example 1, except that colloidal silica (average particle diameter: 5-100 nm), as a filler for increasing the durability of a cured product, was further included in the composition.

Comparative Examples 1 to 3

A cured product was formed by curing a composition on a substrate in the same manner as in Example 1, except that the composition was cured under a curing condition summarized in Table 2 below.

TABLE 2

|  |  | Comparative Example 1 | Comparative Example 2 | Comparative Example 3 |
|---|---|---|---|---|
| First light irradiation | Wavelength range | — | 172 ± 5 nm | 180 nm |
|  | Irradiation amount | — | 120 mJ/cm$^2$ | 120 mJ/cm$^2$ |
|  | Substrate migration rate | — | 20 ± 1 m/min | 20 ± 1 m/min |
|  | Gas condition | — | N$_2$ condition (O$_2$ 100 ppm) | N$_2$ condition (O$_2$ 100 ppm) |
| Second light irradiation | Wavelength range | 750 nm or higher | — | 750 nm or higher |
|  | Irradiation amount | 80 mJ/cm$^2$ | — | 80 mJ/cm$^2$ |
|  | Substrate migration rate | 20 ± 1 m/min | — | 20 ± 1 m/min |
|  | Gas condition | Under air condition | — | Under air condition |
| Third light irradiation | Wavelength range | 250~400 nm | 250~400 nm | — |
|  | Irradiation amount | 600 mJ/cm$^2$ | 600 mJ/cm$^2$ | — |
|  | Substrate migration rate | 20 ± 1 m/min | 20 ± 1 m/min | — |
|  | Gas condition | N$_2$ condition (O$_2$ 200 ppm) | N$_2$ condition (O$_2$ 200 ppm) | — |

Experimental Example 1

To evaluate gloss, stain resistance, and abrasion resistance of the cured product according to the present invention, a gloss degree, a color coordinate deviation due to iodine contamination, and Taber abrasion resistance of each of the cured products manufactured in Examples 1 to 4 and Comparative Examples 1 to 3 were measured. Particular measurement methods are as follows, and measurement results are summarized in Table 3 below:

A) Gloss Degree Evaluation

Measured under a 60° gloss condition using a gloss meter.

B) Stain Resistance Evaluation

Three arbitrary points, A to C, were selected on a specimen surface. The selected points were subjected to color coordinate measurement in the CIE color space to find average color coordinates and a color coordinate deviation.

Next, one or two drops of an iodine (I$_2$) test solution (reagent name: iodine tincture) dissolved in methanol at a concentration of 1 vol % were added to the specimen surface at 22±1° C. and 50±5% RH, and it was confirmed that the drops were circularly spread. After 1 hour, the iodine on the surface was removed by rubbing twice with a tissue moistened with alcohol, and the iodine (I$_2$)-applied points were subjected to color coordinate measurement in the CIE color space to investigate an average color coordinate change and a color coordinate deviation change.

C) Taber Abrasion Resistance Evaluation

The weight of a specimen was measured, and the specimen was subjected to an abrasion resistance test 500 times using an H-18 abradant and Taber abraser (5135 Rotary Platform abraser, manufactured by Erichsen) under a load of 500 g, followed by measuring the weight of the worn specimen so as to compare a weight change in the specimen before and after the test.

TABLE 3

|  | Gloss degree | CIE color coordinate deviation [ΔE] | Weight change |
|---|---|---|---|
| Example 1 | 5 ± 0.5 | 0.678 ± 0.005 | 385 mg |
| Example 2 | 4 ± 0.5 | 0.748 ± 0.005 | 342 mg |
| Example 3 | 8 ± 0.5 | 0.544 ± 0.005 | 280 mg |
| Example 4 | 4 ± 0.5 | 0.497 ± 0.005 | 247 mg |
| Comparative Example 1 | 60 ± 0.5 | 1.289 ± 0.005 | 451 mg |
| Comparative Example 2 | 4 ± 0.5 | 1.483 ± 0.005 | 466 mg |
| Comparative Example 3 | uncured | 11.8 ± 0.005 | — |

As shown in Table 3, it can be confirmed that the cured product according to the present invention cured by sequentially irradiating light in different specific wavelength ranges exhibits low gloss, even if a composition thereof excludes a matting agent, and excellent stain resistance and abrasion resistance.

In particular, the cured products of Examples 1 to 4 exhibited gloss degrees of 8 or less under a 60° gloss condition, without use of a matting agent. In addition, an average color coordinate deviation (ΔE) before and after contamination with iodine of a surface of each of the cured products was confirmed as 1 or less, particularly 0.9 or less, 0.8 or less, or 0.1 to 0.8. In addition, the cured products of Examples 1 to 4 exhibited high curing rates, although the compositions thereof included a small amount, i.e., 2 parts by weight or less, of an initiator, and exhibited a weight change rate of 400 mg or less, particularly about 380 to 390 mg, during Taber abrasion resistance evaluation due to improved abrasion resistance.

On the other hand, the cured products of Comparative Examples 1 to 3 exhibited a gloss degree of 10 or more under a 60° gloss condition or insufficient curing of compositions thereof and exhibited a weight change rate of about 420 mg or more during Taber abrasion resistance evaluation, due to exclusion of any one of the first to third light irradiation steps.

From these results, it can be confirmed that, when a composition is cured by sequentially irradiating light in different specific wavelength ranges, a curing rate of the composition increases, gloss of a cured product therefrom is decreased, and stain resistance and abrasion resistance of the cured product are improved.

The invention claimed is:

1. A method of manufacturing a cured product, the method comprising:
    a first light irradiation step of irradiating an acrylic resin composition with light having a wavelength of 100 nm to 175±2 nm to activate a composition;
    a second light irradiation step of irradiating the composition activated from the first light irradiation step with light having a wavelength of 700 nm or higher to thermally cure the composition; and
    a third light irradiation step of irradiating the thermally cured composition with light having a wavelength of 400 nm or less to optically cure the composition,
    wherein, in the first light irradiation step, an excimer generated by the irradiated light shrinks the surface of the composition to form wrinkles.
2. The method according to claim 1, wherein the first and third light irradiation steps are performed under an inert gas condition where the concentration of oxygen ($O_2$) is 10 ppm to 10,000 ppm.
3. The method according to claim 1, wherein, in the second light irradiation step, a surface temperature of the composition is 20 to 90° C.
4. The method according to claim 1, wherein the composition has a viscosity of 100 cps to 1,000 cps at 25±1° C.
5. The method according to claim 1, further comprising, after the third light irradiation step, a fourth light irradiation step of irradiating the optically cured composition with light having a wavelength of 700 nm or higher to thermally cure the composition.

* * * * *